United States Patent
Tokumitsu et al.

(10) Patent No.: US 7,173,087 B2
(45) Date of Patent: *Feb. 6, 2007

(54) HYDROGENATED NITRILE RUBBER COMPOSITION

(75) Inventors: Hideyuki Tokumitsu, Tsukuba (JP); Takuya Yamanaka, Tsukuba (JP)

(73) Assignee: NOK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/493,506

(22) PCT Filed: Aug. 19, 2003

(86) PCT No.: PCT/JP03/10439

§ 371 (c)(1),
(2), (4) Date: Apr. 21, 2004

(87) PCT Pub. No.: WO2004/022643

PCT Pub. Date: Mar. 18, 2004

(65) Prior Publication Data

US 2004/0266938 A1    Dec. 30, 2004

(30) Foreign Application Priority Data

Sep. 9, 2002    (JP) .............................. 2002-262878

(51) Int. Cl.
*C08K 3/04*    (2006.01)

(52) U.S. Cl. .................................................. 524/565

(58) Field of Classification Search ........ 524/495–496, 524/565
See application file for complete search history.

(56) References Cited

U.S. PATENT DOCUMENTS

| | | | | | |
|---|---|---|---|---|---|
| 4,654,404 | A | * | 3/1987 | Watanabe et al. ............ | 525/315 |
| 5,240,766 | A | * | 8/1993 | Foster ...................... | 428/297.4 |
| 6,489,385 | B1 | * | 12/2002 | Fujii et al. .................. | 524/186 |

| | | | |
|---|---|---|---|
| 2005/0245666 | A1 * | 11/2005 | Yamanaka .................. 524/495 |

FOREIGN PATENT DOCUMENTS

| | | | |
|---|---|---|---|
| JP | 07-330957 | * | 12/1995 |
| JP | 7-330957 | | 12/1995 |
| JP | 10-182882 | | 7/1998 |
| JP | 2000-267940 | | 9/2000 |
| JP | 2000-281091 | | 9/2000 |
| JP | 2000-348690 | | 11/2000 |
| JP | 2002-080639 | * | 3/2002 |
| JP | 2002-080639 A | * | 3/2002 |
| WO | WO 01/09237 | | 7/2000 |

OTHER PUBLICATIONS

Design News. Product News—Elastomers [online]. Design News, 2001 [retrieved Jul. 6, 2005]. Retrieved from the Internet: <URL;http://www.designnews.com/article/CA85882.html>.*
Synthetic Rubbers Product List. Zetpol 1000L [online]. Zeon Corporation, 2004 [retrieved Jul. 6, 2005]. Retrieved from the Internet: <URL:http://www.zeon.co.jp/business_e/enterprise/rubber/rubber_hnbr.html>.*
Machine Translation of JP2002-080639 A (2002).*

* cited by examiner

*Primary Examiner*—Peter Szekely
(74) *Attorney, Agent, or Firm*—Butzel Long

(57) ABSTRACT

A hydrogenated nitrite rubber composition for providing a cross-linked product having a 20% modulus of 10 MPa or more and a thermal conductivity of 0.4 W/m·K or more at 25° C. The hydrogenated nitrile rubber composition includes 100 parts by weight of hydrogenated nitrile rubber having a bound acrylonitrile content of 40% or more, a polymer Mooney viscosity $ML_{1+4}$ (100° C.) of 75 or less (median) as determined according to JIS K-6395, an iodine value of 23 or less (median), and at least 110 parts by weight in sum total of carbon black as a filler and other gas shielding filler. The hydrogenated nitrile rubber composition can effectively be used as a molding material for sliding applications or for a static sealing members for highly permeable gases. The hydrogenated nitrile rubber composition has a distinguishing carbon dioxide gas shieldability, heat resistance, and wear characteristics.

13 Claims, No Drawings

HYDROGENATED NITRILE RUBBER COMPOSITION

TECHNICAL FIELD

The present invention relates to a hydrogenated nitrile rubber composition and more particularly to a hydrogenated nitrile rubber composition capable of providing cross-linked molding products with distinguished gas shieldability, heat resistance, wear characteristics, etc.

BACKGROUND ART

Flon R-134a (1,1,1,2-tetrafluoroethane) called new refrigerant is now mainly used as refrigerant for refrigerators, etc., but the future use of the refrigerant is, however, not so promising and will be banned due to a more strict environmental control problem, etc. As a substitute for the refrigerant, hydrocarbon-based gases and a carbon dioxide gas have now been in the spotlight, among which the hydrocarbon gases have a considerably high risk of explosion and combustion, whereas the carbon dioxide gas would be a next-generation refrigerant even according to the world outlook.

However, the carbon dioxide gas is used under higher gas pressure than flon gases and has a higher permeability or solubility through or in the ordinary polymer materials, so that blistering (foaming) will easily occur. Even in a case where no blistering occurs, pressure holding and tight sealing will be hard to maintain, because polymer materials themselves have a high carbon dioxide gas permeability.

Rubber materials usually have likewise a high carbon dioxide gas permeability, which is particularly remarkable under gas pressure of 1 MPa or more, so that the carbon dioxide gas cannot be fully sealed. Furthermore, carbon dioxide dissolves easily into polymers, causing considerable swelling. Accordingly, no rubber material parts have been actually used so far in apparatuses using the carbon dioxide gas.

To solve these problems, a butyl rubber composition comprising butyl rubber and carbon black having a CTAB specific surface area of about 30 -about 100 m²/g has been proposed as a carbon dioxide gas sealing material (JP-A-2002-053718), or a molding material for carbon dioxide use, which comprises chlorinated polyethylene having a chlorine content of 25–47 wt. % or a blend thereof with vinyl chloride-based resin has been proposed as a carbon dioxide sealing material (WO 01/09237) for O-rings, lip seals, etc. These materials have a good carbon dioxide shieldability, but are not satisfactory for heat resistance and wear resistance.

To improve the heat resistance and wear resistance, hydrogenated NBR highly filled with a filler has been proposed (JP-A-2002-080639, JP-A-2002-146342), but its carbon dioxide shieldability is not so high as those of butyl rubber or chlorinated polyethylene.

DISCLOSURE OF THE INVENTION

An object of the present invention is to provide a hydrogenated nitrile rubber composition for effective use as a molding material for sliding application or for a static sealing member for highly permeable gas with distinguished carbon dioxide gas shieldability, heat resistance, wear characteristics, etc.

The object of the present invention can be attained by a hydrogenated nitrile rubber composition capable of providing cross-linking products having a 20% modulus of 10 MPa or more and a thermal conductivity of 0.4 W/m·K or more at 25° C., which comprises 100 parts by weight of hydrogenated nitrile rubber having a bound acrylonitrile content of 40% or more, a polymer Mooney viscosity $ML_{1+4}$ (100° C.) of 75 or less (median) according to JIS K-6395 and an iodine value of 23 or less (median), and not less than 110 parts by weight in sum total as a filler consisting of carbon black and other gas shielding fillers.

Hydrogenated nitrile rubber for use in the present invention has a bound acrylonitrile (AN) content of 40% or more, preferably 40–50%, a Mooney viscosity (median) of 75 or less, preferably 70–60, and an iodine value (median) of 23 or less, preferably 4–20, where the term "median" is defined as a value in the middle of a plurality of measurements. The hydrogenated NBR given in the Examples and Comparative Examples as mentioned below has the median values of these measurements.

When hydrogenated nitrile rubber having a bound acrylonitrile content of less than 40%, not only the 20% modulus value of the normal state physical property will be lowered, but also the gas permeability will be considerably increased, so that the resulting cross-linked products cannot be used as a carbon dioxide gas shielding material. When hydrogenated nitrile rubber having a Mooney viscosity of more than 75, it will be difficult to use a large amount of a filler in the kneading to molding, and even if it is possible to conduct the kneading, flow failure will occur during the molding, so that products with a desired shape cannot be molded. Still furthermore, when the hydrogenated nitrile rubber has an iodine value of more than 23, the heat resistance will be deteriorated.

To 100 parts by weight of hydrogenated nitrile rubber with such properties as mentioned above are added not less than 110 parts by weight in sum total as a filler consisting of carbon black and other gas shielding fillers. When the sum total as a filler consisting of carbon black and other gas shielding fillers is less than 110 parts by-weight, any satisfactory wear characteristics cannot be obtained. Other gas shieding fillers include gas-impermeable fillers, preferably non-porous inorganic powdery materials, for example, graphite, carbon fibers, mica, talc, etc., among which graphite is essential for improving the thermal conductivity and wear characteristics, and carbon fibers are essential for improving the wear characteristics. Preferable combination of fillers consisting of carbon black and other gas shielding fillers includes a combination comprising 30–100 parts by weight of carbon black and 10–80 parts by weight graphite, or a combination comprising 30–100 parts by weight of carbon black, 10–60 parts by weight of graphite and 5–60 parts by weight of carbon fibers. The total fillers in any of such combination has a volume fraction of 35% or more, preferably 35–74%, on the basis of the composition.

Carbon black for use in the present invention includes SRF, HAF, ISAF grade carbon black, etc. In case of using carbon black only in the above-mentioned proportion, any desired improvement of heat resistance, wear characteristics and thermal conductivity cannot be obtained. Any commercially available graphite can be used in the present invention, and its addition is effective particularly for improvement of wear characteristics and thermal conductivity. Carbon fibers for use in the present invention includes pitch-based, PAN-based carbon fibers, etc., usually in fiber diameter of about 1 -about 20 μm and fiber length of about 0.03 -about 1 mm. When the carbon fibers are used together with graphite, the wear resistance can be much more improved.

Other fillers includes non-porous inorganic powdery materials, for example, mica, talc, silica, clay, active calcium carbonate, calcium silicate, etc. or polytetrafluoroethylene powder. In case of using silica, it is preferable for improvement of reinforcement to use a silane coupling agent, etc. together. It is expected that the addition of polytetrafluoroethylene powder can further improve a lubricating property.

The hydrogenated nitrile rubber composition comprising the above-mentioned components is usually subjected to peroxide cross-linking, using an organic peroxide. The organic peroxide includes, for example, di-tbutylperoxide, dicumyl peroxide, t-butylcumyl peroxide, 1,1-di(t-butylperoxy)-3,5,5-trimethylcyclohexane, 2,5-dimethyl-2,5-(t-butylperoxy)-hexane, 2,5-dimethyl-2,5-di(t-butylperoxy)hexine-3,1,3-di(benzoylperoxy)-hexane, t-butylperoxybenzoate, t-butylperoxyisopropyl carbonate, n-butyl-4,4'-di(t-butylperoxy)valerate, etc. About 1 -about 10 parts by weight, preferably about 2 -about 8 parts, of an organic peroxide is used on the basis of 100 parts by weight of the hydrogenated nitrile rubber.

It is preferable to use a polyfunctional unsaturated compound as a cocross-linking agent together with the organic peroxide. For example, about 1 -about 10 parts by weight, preferably about 1 -about 5 parts by weight, of triallyl(iso)cyanurate, trimethylolpropane tri(meth)acrylate, triallyl trimellitate, butadiene oligomer or the like is used on the basis of 100 parts by weight of the hydrogenated nitrile rubber.

The hydrogenated nitrile rubber composition can further contain various additives usually used in the rubber industry such as a processing aid, e.g. stearic acid, palmitic acid, paraffin wax, etc., an acid acceptor, e.g. zinc oxide, magnesium oxide, hydrotalcite, etc., an antioxidant, a plasticizer, etc., as desired.

Preparation of the composition is carried out by kneading through a kneader such as Intermix, a kneader, Bambury mixer, etc., or open rolls, etc. Its cross-linking is carried out by heating usually at about 160° -about 220° C. for about 1 -about 10 minutes through an injection molding machine, a compression molding machine, a vulcanization press, etc., if necessary, followed by a heat treatment at about 180° C. or higher for about 1 -about 30 hours. The heat treatment is effective for further improvement of heat resistance.

The composition to be cross-linked in such a manner as mentioned above can give cross-linked products having a 20% modulus of 10 MPa or more and a thermal conductivity of 0.4 W/m·K or more, preferably 0.5 W/m·K or more at 25° C. When the 20% modulus value is higher, deformation of materials due to gas pressure takes place less, so that gas leakage due to the deformation can be prevented. Generally, the rubber materials have a low thermal conductivity, but when the thermal conductivity can be made higher, heat radiation can take place more easily at the sliding surfaces, which will be favorable with respect to the heat resistance.

BEST MODES FOR CARRYING OUT THE INVENTION

The present invention will be described in detail below, referring to Examples.

EXAMPLE 1

| | |
|---|---|
| Hydrogenated NBR (Zetpol 1000 L, a product of Nippon Zeon Co., Ltd.; AN content: 44.2%, iodine value: 7, Mooney viscosity: 70) | 100 parts by weight |
| HAF carbon black | 90 parts by weight |
| Carbon fibers (pitch-based carbon fiber, a product of Osaka Gas Chemical Co., Ltd.,; fiber diameter: 10 μm, fiber length: 0.06 mm) | 45 parts by weight |
| Graphite (AO, a product of Nichiden Carbon Co., Ltd.) | 15 parts by weight |
| Antioxidant (#445, a product of Uniroyal Co., Ltd.) | 2 parts by weight |
| Organic peroxide (Percumyl D, a product of NOF Corp.) | 6 parts by weight |
| Polyfunctional unsaturated compound cocross-linking agent (B3000, a product of JSR) | 5 parts by weight |

The foregoing components (filler volume fraction: 36.8%) were kneaded together through 10-inch rolls and then subjected to press cross-linking at 180° C. for 3 minutes to mold 0.2 mm-thick test pieces and also to mold lip-type seals for rotary test (inner diameter: 10 mm).

The test pieces and the lip-type seals were subjected to determination of the following properties:

Normal state physical properties: according to JIS K-6251

Heat ageing resistance: to determine percent elongation change after air-heated aging test at 200° C. for 70 hours Wear characteristics: to determine a wear breadth generated by means of a shaft-type rotary tester at a peripheral speed of 2 m/sec and a carbon dioxide gas pressure of 5 MPa for 18 hours Gas barrier characteristics: to measure a carbon dioxide gas leakage rate per 24 hours from a shaft-type rotary tester Thermal conductivity: by means of a thermal conductivity measuring apparatus ARC-TC-1, made by Agne Co., Ltd., under room temperature conditions (25° C.)

Moldability: to visually determine a mold flowability at the 0.2 mm-thick sheet molding Kneadability: to visually determine a frequency of bagging occurrences at the open roll kneading

EXAMPLE 2

In Example 1, the same amount of SRF carbon black was used in place of HAF carbon black.

EXAMPLE 3

In Example 1, the amount of graphite was changed to 60 parts by weight without using the carbon fibers.

COMPARATIVE EXAMPLE 1

In Example 1, the same amount of Zetpol 2000, a product of Nippon Zeon Co., Ltd. (AN content: 36.2%, iodine value: 4, Mooney viscosity: 85) was used as the hydrogenated NBR.

COMPARATIVE EXAMPLE 2

In Example 2, the same amount of Zetpol 2000, a product of Nippon Zeon Co., Ltd. (AN content: 36.2%, iodine value: 4, Mooney viscosity: 85) was used as the hydrogenated NBR.

COMPARATIVE EXAMPLE 3

In Example 1, the same amount of Zetpol 1010, a product of Nippon Zeon Co., Ltd. (AN content: 44.2%, iodine value: 7, Mooney viscosity: 85) was used as the hydrogenated NBR.

COMPARATIVE EXAMPLE 4

In Example 1, the same amount of Zetpol 1420 (AN content: 43.2%, iodine value: 24, Mooney viscosity: 70) was used as the hydrogenated NBR.

COMPARATIVE EXAMPLE 5

In Example 1, the graphite was not used (filler volume fraction: 34.6%).

Results obtained in the foregoing Examples and Comparative Examples are given in the following Table.

TABLE

| Determination Item | Example 1 | Example 2 | Example 3 | Comp. Ex. 1 | Comp. Ex. 2 | Comp. Ex. 3 | Comp. Ex. 4 | Comp. Ex. 5 |
|---|---|---|---|---|---|---|---|---|
| Normal state physical properties | | | | | | | | |
| Hardness (shore A) | 95 | 94 | 95 | 98 | 97 | 98 | 95 | 89 |
| 20% modulus (MPa) | 17 | 16 | 17 | 11 | 10 | 16 | 16 | 9 |
| Heat ageing resistance | | | | | | | | |
| Percent elongation change (%) | −8 | −9 | −8 | −9 | −9 | −8 | −20 | −10 |
| Wear characteristics | | | | | | | | |
| Wear breadth (mm) | 0.18 | 0.19 | 0.18 | — | 0.20 | — | 0.25 | 0.30 |
| Gas barrier characteristics | | | | | | | | |
| Gas leakage rate (cc/day) | 1.8 | 1.8 | 1.8 | — | 1.8 | — | 1.9 | 2.5 |
| Thermal conductivity (W/m·K) | 0.60 | 0.59 | 0.59 | 0.52 | 0.58 | 0.59 | 0.57 | 0.28 |
| Moldability | | | | | | | | |
| Mold flow failure | none | none | none | considerable | a little | considerable | none | none |
| Kneadability | | | | | | | | |
| Frequency of bagging occurrence | very Low | low | low | very high | high | very high | low | low |

In Comparative Examples 1 and 3, any lip-type seals could not be molded due to flow failure, and thus the wear characteristics and gas barrier characteristics could not be determined.

From the afore-mentioned results the following conclusion can be made:

(1) All the Examples show good normal state physical properties, heat resistance, wear characteristics, gas barrier characteristics, thermal conductivity, moldability and kneadability.

(2) Comparative Examples 1 and 3 using hydrogenated NBR having a higher Mooney viscosity and HAF carbon black show poor kneadability and moldability, failing to mold lip-type seals.

(3) Comparative Examples 1 and 2 using hydrogenated NBR having an acrylonitrile content of less than 40% show a lower 20% modulus value.

(4) Comparative Example 4 using hydrogenated NBR having an iodine value of 24 shows poor heat resistance.

(5) Comparative Example 5 showing a filler volume fraction of less than 35% shows poor gas barrier characteristics and a lower thermal conductivity.

INDUSTRIAL APPLICABILITY

The present hydrogenated nitrile rubber composition can give cross-linked molding products having good gas shieldability, heat resistance and wear characteristics, and a good thermal conductivity at 25° C. such as 0.4 W/m·K or more, and thus can be effectively used as molding materials for sliding application or for static sealing member for highly permeable gases. The present composition also has good kneadability and moldability in spite of the presence of the filler even at a high filling rate.

The invention claimed is:

1. A hydrogenated nitrile rubber composition for producing a cross-linked product having a 20% modulus of 10 MPa or more, which comprises 100 parts by weight of hydrogenated nitrile rubber having a bound acrylonitrile content of 44.2–50% a median Mooney viscosity $ML_{1+4}$ (100° C.) of 75 or less and a median iodine value of 23 or less, and not less than 110 parts by weight in sum total as a filler comprising 30–100 parts by weight of carbon black and 10–80 parts by weight of graphite as a gas shielding filler, a volume fraction of the filler being 35–74% on the basis of the composition said hydrogenated nitrile rubber composition being substantially impermeable to pressurized carbon dioxide so as to function as a carbon dioxide sealant material.

2. A hydrogenated nitrile rubber composition according to claim 1, wherein the cross-linked product has a thermal conductivity of 0.4 W/m·K or more at 25° C.

3. A hydrogenated nitrile rubber composition according to claim 1, wherein the filler comprises 30–100 parts by weight of carbon black and 10–60 parts by weight of graphite and 5–60 parts by weight of carbon fibers.

4. A hydrogenated nitrile rubber composition according to claim 1, wherein the total amount of all fillers has a volume fraction of 35% or more, based upon the volume of the hydrogenated nitrile rubber composition.

5. A sealing member molded from the hydrogenated nitrile rubber composition according to claim 1.

6. A cross linked molding product obtained by cross-linking a hydrogenated nitrile rubber composition according to claim 1.

7. A cross linked molding product according to claim 6 which comprises a sealing member.

8. A hydrogenated nitrile rubber composition according to claim 1, wherein the total amount of all fillers has a volume fraction of 35% or more, based upon the volume of the hydrogenated nitrile rubber composition.

9. A hydrogenated nitrite rubber composition according to claim 3, wherein the total amount of all fillers has a volume fraction of 35% or more, based upon the volume of the hydrogenated nitrile rubber composition.

10. A sealing member molded from the hydrogenated nitrile rubber composition according to claim 2.

11. A cross linked molding product obtained by cross-linking a hydrogenated nitrile rubber composition according to claim 2.

12. A cross linked molding product according to claim 11 which comprises a sealing member.

13. A process for producing a sealing member having a 20% modulus of 10 MPa of more, said process comprising the steps of:
   a) preparing a mixture comprising:
      100 parts by weight of hydrogenated nitrile rubber having a bound aciylonitrile content of 44.2–50%, a median Mooney viscosity $ML_{1+4}$ (100° C.) of 75 or less and a median iodine value of 23 or less;
      not less than 110 parts by weight in sum total as a filler comprising 30–100 parts by weight of carbon black and 10–80 parts by weight of graphite as a gas shielding filler, a volume fraction of the filler being 35–74% on the basis of the mixture, and
      a crosslinking agent;
   b) crosslinking the mixture to obtain a crosslinked molding product; and then
   c) subjecting the crosslinked molding produce to contact with pressurized carbon dioxide.

* * * * *